United States Patent
Kiefer et al.

(10) Patent No.: US 12,275,086 B2
(45) Date of Patent: Apr. 15, 2025

(54) METHOD AND DEVICE FOR PROCESSING A WORKPIECE

(71) Applicant: TRUMPF Werkzeugmaschinen GmbH + Co. KG, Ditzingen (DE)

(72) Inventors: Manuel Kiefer, Sinsheim (DE); Christoph Bloemker, Stuttgart (DE); Uwe Mienhardt, Korntal-Muenchingen (DE); Jens Ottnad, Karlsruhe (DE); Leonie Felica Tatzel, Korntal (DE); Korbinian Weiss, Korntal (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 832 days.

(21) Appl. No.: 17/219,924

(22) Filed: Apr. 1, 2021

(65) Prior Publication Data
US 2021/0245298 A1     Aug. 12, 2021

Related U.S. Application Data

(63) Continuation of application No. PCT/EP2019/075452, filed on Sep. 23, 2019.

(30) Foreign Application Priority Data

Oct. 1, 2018  (DE) .................. 10 2018 216 873.3

(51) Int. Cl.
*B23K 26/08*  (2014.01)
*B23K 26/38*  (2014.01)
*G05B 19/18*  (2006.01)

(52) U.S. Cl.
CPC .......... *B23K 26/0892* (2013.01); *B23K 26/38* (2013.01); *G05B 19/182* (2013.01); *G05B 2219/45041* (2013.01)

(58) Field of Classification Search
CPC .. B23K 26/0892; B23K 26/38; G05B 19/182; G05B 2219/45041
USPC ..................................................... 219/121.72
See application file for complete search history.

(56) References Cited

U.S. PATENT DOCUMENTS

| | | | | |
|---|---|---|---|---|
| 4,403,134 | A  * | 9/1983 | Klingel | ................ B23K 26/147 |
| | | | | 219/121.72 |
| 6,133,541 | A  * | 10/2000 | Neubauer | ............... B23K 10/00 |
| | | | | 219/121.6 |
| 6,345,205 | B1 | 2/2002 | Aoki et al. | |

(Continued)

FOREIGN PATENT DOCUMENTS

| | | | | |
|---|---|---|---|---|
| CN | 109074047 | A  * | 12/2018 | ............. B21D 5/004 |
| DE | 102010020183 | A1 | 11/2011 | |

(Continued)

*Primary Examiner* — Jimmy Chou
(74) *Attorney, Agent, or Firm* — LEYDIG, VOIT & MAYER, LTD.

(57) ABSTRACT

A method for processing a workpiece with a laser cutting machine includes reading out a machine parameter and a material parameter and outputting a process parameter recommendation. The process parameter recommendation is created by a process parameter algorithm with at least one data aggregation routine based on a plurality of cut edge quality features. The method further includes generating a cut edge by laser processing the workpiece.

15 Claims, 1 Drawing Sheet

(56) References Cited

U.S. PATENT DOCUMENTS

| | | | | |
|---|---|---|---|---|
| 6,947,802 | B2* | 9/2005 | Picard | B23K 26/14 |
| | | | | 700/170 |
| 7,107,118 | B2* | 9/2006 | Orozco | B23K 26/348 |
| | | | | 219/121.61 |
| 9,446,472 | B2* | 9/2016 | Winn | B23K 26/38 |
| 10,773,343 | B2 | 9/2020 | Takeda | |
| 2008/0185368 | A1* | 8/2008 | Fagan | B23K 7/001 |
| | | | | 219/124.21 |
| 2009/0250445 | A1* | 10/2009 | Yamaguchi | G05B 19/404 |
| | | | | 219/121.72 |
| 2010/0147813 | A1* | 6/2010 | Lei | C03B 33/0222 |
| | | | | 219/121.72 |
| 2011/0192825 | A1* | 8/2011 | Calefati | B23K 31/12 |
| | | | | 219/121.64 |
| 2013/0068738 | A1 | 3/2013 | Schuermann et al. | |
| 2013/0313235 | A1* | 11/2013 | Wadehn | B23K 26/40 |
| | | | | 219/121.72 |
| 2014/0069898 | A1* | 3/2014 | Debecker | B23K 26/064 |
| | | | | 219/121.72 |
| 2014/0197144 | A1* | 7/2014 | Earhart | B23K 26/38 |
| | | | | 219/121.72 |
| 2015/0038313 | A1* | 2/2015 | Hosseini | B23K 26/0648 |
| | | | | 219/121.75 |
| 2015/0136743 | A1* | 5/2015 | Hosseini | C03B 33/091 |
| | | | | 219/121.61 |
| 2015/0151380 | A1* | 6/2015 | Hosseini | B23K 26/53 |
| | | | | 219/121.72 |
| 2015/0239059 | A1* | 8/2015 | Myers | B23K 26/702 |
| | | | | 219/121.44 |
| 2016/0059354 | A1* | 3/2016 | Sercel | B23K 26/0853 |
| | | | | 219/121.68 |
| 2017/0113300 | A1* | 4/2017 | Lüdi | B23K 26/032 |
| 2018/0207747 | A1* | 7/2018 | Bakmazjian | B23K 10/00 |
| 2019/0107821 | A9 | 4/2019 | Shapiro et al. | |
| 2020/0254559 | A1 | 8/2020 | Bader et al. | |

FOREIGN PATENT DOCUMENTS

| | | | | |
|---|---|---|---|---|
| DE | 102010020183 | B4 | 7/2013 | |
| DE | 212014000071 | U1 | 11/2015 | |
| EP | 3159093 | A1 | 4/2017 | |
| JP | H09239576 | A | 9/1997 | |
| JP | 2001138082 | A | 5/2001 | |
| JP | 2002239760 | A | 8/2002 | |
| JP | 4741478 | B2 | 8/2011 | |
| JP | 2016159313 | A | 9/2016 | |
| WO | WO-2012000995 | A1 * | 1/2012 | ............ G05B 15/02 |
| WO | WO 2014140747 | A2 | 9/2014 | |
| WO | WO 2017142470 | A1 | 8/2017 | |

* cited by examiner

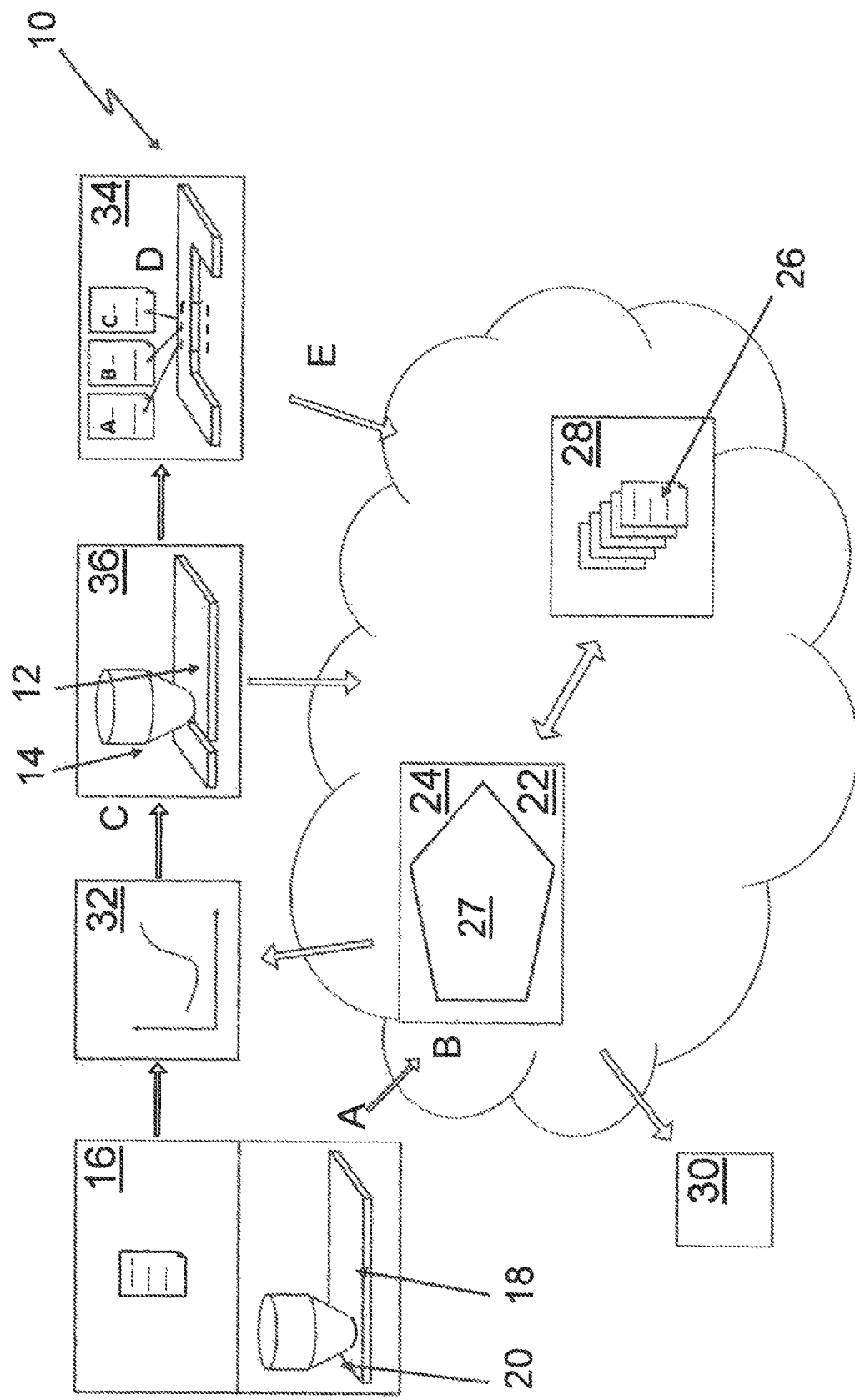

METHOD AND DEVICE FOR PROCESSING A WORKPIECE

CROSS-REFERENCE TO PRIOR APPLICATIONS

This application is a continuation of International Patent Application No. PCT/EP2019/075452, filed on Sep. 23, 2019, which claims priority to German Patent Application No. DE 10 2018 216 873.3, filed on Oct. 1, 2018. The entire disclosure of both applications is hereby incorporated by reference herein.

FIELD

The present disclosure relates to a method and a device for processing a workpiece with a laser cutting machine.

BACKGROUND

Laser cutting methods are preferred for the rapid production and processing of precise workpieces. In the conventional case, the workpiece is cut from a plate, in particular in the form of sheet metal, using a laser. The energy introduced by the laser results, depending on the method, in melting, burning, or sublimation of the workpiece material in the kerf. In particular, with the aid of a process gas, the removed material is discharged from the kerf.

The resulting cut edge has a surface with characteristic features that allow conclusions to be drawn about the process sequence or the process parameters, such as cutting speed or the distance between the nozzle and sheet metal. Depending on the process and field of application of the workpieces produced, a determined surface quality of the cut edge is to be achieved. In the conventional method, a person skilled in the art is required to interpret the characteristic features and to make appropriate process parameter settings that result in an improvement in the cut edge quality. A person skilled in the art makes changes to the process parameters on the basis of experience based on subjective considerations of the cut edge.

In order to reduce process and quality fluctuations through decisions on the basis of subjective considerations, objective measurement methods are increasingly being used to support a person skilled in the art, which, however, have not yet led to any improvements in the process flow.

SUMMARY

In an embodiment, the present invention provides a method for processing a workpiece with a laser cutting machine. The method includes reading out a machine parameter and a material parameter and outputting a process parameter recommendation. The process parameter recommendation is created by a process parameter algorithm with at least one data aggregation routine based on a plurality of cut edge quality features. The method further includes generating a cut edge by laser processing the workpiece.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 is a schematic representation of an embodiment of a method or of a device according to the present disclosure.

DETAILED DESCRIPTION

The present disclosure provides a method or a device which allows for an improved quality of the resulting cut edge and at the same time allows for a simple use even by a user who is not a person skilled in the art.

According to the present disclosure, a method for processing a workpiece with a laser cutting machine is provided. The method includes:

A) reading out a machine parameter, a material parameter, and in particular at least one desired process parameter and/or at least one desired cut edge quality feature;

B) outputting a process parameter recommendation to achieve the cut edge quality features, the process parameter recommendation being created by a process parameter algorithm with a data aggregation routine based on a plurality of cut edge quality features, in particular a plurality of types of cut edge quality features; and C) generating a cut edge by laser processing the workpiece.

The method thus comprises, according to method step A), reading out at least one machine parameter, at least one material parameter, and in particular at least one desired cut edge quality feature and/or desired process parameter. As a result, the framework conditions for calculating the changed, in particular improved, preferably optimal, process parameters are established by the process parameter algorithm. The process parameter algorithm determines the changed, in particular improved, preferably optimal process parameters for the defined boundary conditions and outputs a process parameter recommendation. There can be a substantial difference between the desired cut edge quality feature(s) and the cut edge quality feature(s) that can actually be achieved. For example, a desired cut edge quality feature can lie outside the achievable quality. The process parameter algorithm then outputs the changed, in particular improved, preferably optimal, process parameters for this case in order to get as close as possible to the cut edge quality feature to be achieved. In addition, an indication is preferably given that the desired cut edge quality is outside the achievable quality range. If the desired cut edge quality feature is below the achievable quality, the process parameter algorithm can output the process parameters required to achieve the desired quality in the form of a process parameter recommendation as well as an indication of the maximum possible cut edge quality. A distinction can be made between the desired and the actual/implemented cut edge quality.

The process parameter algorithm has at least one, in particular a plurality of data aggregation routine(s). A data aggregation routine can be designed to aggregate a plurality of "determined data" into a new data packet. The new data packet can have one or more numbers or vectors. The new data packet can be made available in full or in part to further data aggregation routines as "determined data." "Determined data" can be, for example, machine data, material data, process data, and/or data packets made available by one of the data aggregation routine(s). The process parameter algorithm is particularly preferably designed in the form of an algorithm having a plurality of connected data aggregation routines. In particular, several hundred, preferably several thousand, such data aggregation routines can be interconnected. This significantly improves the quality and speed of the process parameter algorithm. The process parameter algorithm can particularly preferably have a function with weighted variables. One, in particular a plurality of, particularly preferably all, data aggregation routines can be designed to combine a plurality of "determined data" in each case with a weighted variable, in particular to multiply and, thus, convert the "determined data" into "combined data," and then to aggregate, in particular add, the "combined data" into a new data packet. The process parameter algorithm can be designed to improve the process parameter recommendation thereof, to check it through feedback, and to improve it further. This can be done, for example, by feedback in the form of data entry. The data can be entered using a data entry device to be operated by an operator, such as a keyboard or a touchpad, or by entering a data record. To improve the process parameter recommendation thereof, the process parameter algorithm can be designed to change the weighted variables. To improve the process parameter recommendation thereof, the process parameter algorithm can alternatively or additionally be designed to change the data aggregation routines. To improve the process parameter recommendation thereof, the process parameter algorithm can alternatively or additionally be designed to change the connections of the data aggregation routines.

The process parameter algorithm and/or a further secondary or superordinate algorithm can be designed to monitor and recognize when one of the algorithms outputs assignment information or when all of the algorithms output assignment information with a specified accumulation that is assessed as "incorrect" by the user, and then issue a negative message or store it in negative memory. The output can be visual, for example on a screen, or in another suitable form, for example as data output. The monitoring algorithm can also be designed to react to the output of such a negative message with an improvement routine that changes further properties or the interaction of one or more of the aforementioned algorithms.

The features of the material, machine, and/or process parameters as well as the cut edge quality features can themselves be data packets, in particular a plurality of structured data, in particular data vectors or data arrays, which themselves may again represent "determined data," e.g. for the process parameter algorithm, in particular for the data aggregation routine(s) of the process parameter algorithm.

The data aggregation routine(s) is/are based on a plurality of cut edge quality features. The data aggregation routine(s), in particular weighting of the data aggregation routine(s), was/were thus set, in particular improved, preferably optimized, by the data aggregation routine(s) itself based on a plurality of determined cut edge quality features. The multiple cut edge quality features were determined beforehand subjectively and/or objectively from cut edges of workpieces that were processed by means of the data aggregation routine(s). The data aggregation routine(s) is/are thus designed to change, in particular to improve, preferably to optimize itself based on at least two different cut edge quality features that were produced on the basis of the data aggregation routine(s).

The method preferably has the option of identifying the workpiece, preferably by attaching a code to the workpiece, particularly preferably by attaching a laser engraving of a QR code to the workpiece during laser processing, in order to clearly assign the cut edge to the basic process conditions, in particular the process parameters. In this way, an analysis of the method, a change, in particular improvement, preferably optimization, of the process parameter algorithm and a later evaluation by a person skilled in the art can be carried out particularly easily.

A method is particularly preferred in which the various types of cut edge quality features contain one and/or more of the following cut edge quality features:
Roughness thickness
Roughness shape
Burr height
Burr shape
Cut edge bevel
Discoloration
Trimmed top edge of cut
Scouring, single scouring, accumulation of scouring, self-burning
Hollow cut surface profile
Edge melting on the upper/lower edge of the cut
Edge hollow cut above the lower edge/lower edge of the cut
Local groove deviation
Cracks in the cut surface
Melt pearl chain on the upper edge of the cut
End of cut surface not cut through
Cutting angle deviation on both cutting surfaces
Cutting angle deviation on a cutting surface
Uneven groove depth
Wavy cut surface profile
Excessive groove lag
Expansion of the kerf on the top/top edge of the workpiece, bottom/bottom edge of the workpiece
Excessive groove depth, severe roughening
Wavy cut surface in the cutting direction
Wavy beginning of the cut
Slag adherence to the underside
Slag crust, welding of the cut edge, bead, folding melt
Dross formation/burr formation, pearl burr, fine needle burr, noticeable burr, long+breakable burr, short+non-breakable burr, very strong burr
Interrupted cut in the longitudinal direction, jet break
Splashes on the material surface, thread formation
Discoloration of the cut surface, discoloration of the end of the cut, discoloration of the cut surface, discoloration of corners, smolder The method can further preferably have the following method steps:
D) determining a plurality of types of cut edge quality features of the machined workpiece;
E) reading out these cut edge quality features in order to change, in particular improve, preferably optimize, the process parameter algorithm.

A change in the weighting of the data aggregation routine(s), in particular the change in the weighted variables, takes place particularly preferably on the basis of the different types of cut edge quality features. The exact structure of these features can change, in particular improve, preferably be optimized, via the automated evaluation of the cut edge quality features. In other words, the process parameter algorithm is not only used with the data aggregation routine(s) which is/are checked and/or improved, in particular continuously improved, on the basis of various cut edge quality features, but the method rather provides for the data aggregation routine(s) to be further checked and/or changed, in particular improved, preferably optimized, by means of the newly obtained and read out cut edge quality features.

A preferred development of the method provides that at least one cut edge quality feature is objectively determined by a measuring device. The measuring device can be designed to carry out measurements in an automated manner and to forward the results automatically, in particular to the process parameter algorithm and/or a database.

In a particularly preferred development of the method, the at least one objectively determined cut edge quality feature is determined by an image recording device, in particular in the form of a camera. The image recording device can create images using radiation in the non-visible, but preferably in the visible, wavelength range. By using an image recording device, in particular in the form of a camera, characteristic features of the cut edge surface can be determined, in particular through automated image acquisition and image analysis. Image acquisition and image analysis are to be understood as two separate processes and can take place separately from one another both in terms of time and location. This allows both the local and spatially spaced analysis of cut edge images. In order to allow for a particularly simple way of image acquisition and subsequent image analysis, pattern recognition software is preferably used for this purpose.

A method is also preferred in which, in method step A), prioritized cut edge quality features are read out. A prioritization of the cut edge quality features allows the user to adapt the cut edge quality particularly individually to his/her ideas and the further processing method. By defining cut edge quality features to which superordinate value is placed and cut edge quality features to which subordinate value is placed, the process parameter algorithm can output a significantly improved recommendation of the process parameters.

Also preferred is a method in which the process parameter algorithm and/or a database are stored cloud-based, wherein the machine parameters, the material parameters, the cut edge quality features, the process parameters and/or the desired cut edge quality features are stored in the database. Cloud-based means, in this case, an, in particular remotely located, preferably anonymized, storage device in which the machine parameter, material parameter, process parameter, cut edge quality features, and/or desired cut edge quality features from more than one, advantageously from several hundred or several thousand different users, are stored. As a result, different users can contribute to the change, in particular to improve, preferably to optimize the process parameter algorithm, which provides the process parameters for carrying out the method, regardless of the manufacturing location. It was recognized that the described methods only achieve resounding success when several tens of thousands, in particular several hundred thousand cut edge quality features have been read out. Such a volume of data is often not achievable in a year for a single manufacturing facility.

A method is also preferred in which the output of the process parameter recommendation in method step B) takes place on a display and/or the output of the process parameter recommendation in method step B) is used directly for laser processing of the workpiece in process step C). This gives the user control over the processing process, since the process parameter recommendation can be taken over manually, in particular taken over automatically after confirmation, particularly preferably taken over automatically or discarded without confirmation. If the process parameter recommendation is rejected, the method can provide for a reason for the user to be recorded, which can be used to further change, in particular improve, preferably optimize, the process parameter algorithm.

The present disclosure further provides a device for processing a workpiece, the device comprising the following:

a) an input unit for inputting a machine parameter, a material parameter and, in particular, a desired process parameter and/or a desired cut edge quality feature;

wherein the device further comprises:

b) a computing unit with a process parameter algorithm for outputting a process parameter recommendation, the process parameter algorithm having at least one data aggregation routine which is based on a plurality of cut edge quality features, in particular a plurality of different types of cut edge quality features;

c) a laser cutting machine for laser processing of the workpiece, in particular for creating the cut edge.

The device is preferably designed as a unit in order to ensure particularly simple handling and smooth operation between the device components. Furthermore, the device can consist of partially or completely networked subcomponents and can be arranged both locally, in particular in the course of a manufacturing line, and spatially far apart from one another, in particular distributed over a plurality of production locations.

A device which furthermore comprises the following is particularly preferred:

d) a measuring device to objectively determine at least one cut edge quality feature that has been achieved.

In the configuration of the device with a measuring device, objectively determined cut edge quality features can be further processed particularly easily by the process parameter algorithm. In particular, the process parameter algorithm can automatically read in the cut edge quality features determined. In a particularly preferred embodiment of the device, the objectively determined cut edge quality features are automatically processed by the process parameter algorithm in order to carry out an automated adaptation of the laser processing process with regard to a desired or an improved or optimal cut edge quality by changing the process parameters.

The measuring device can be designed in the form of an image recording device, in particular in the form of a camera. The camera can be designed both in a device-related manner, in particular as a component of a measuring section within the device, and in a device-independent manner, in particular as a camera of a computer, particularly preferably as a camera of a mobile phone. By the configuration in a device-independent manner, in particular as a camera of a computer, particularly preferably as a camera of a mobile phone, the user can easily and inexpensively record features, in particular scoring and discoloration, on the cut edge surface and provide the device with characteristic cut edge images. An image recording device can record image data in the light range that is visible to humans, but also in other ranges, for example infrared, UV, X-rays. An image recording device can also record image data by means of other wave propagation, for example sound waves, in particular ultrasonic waves.

The input unit can be designed to input at least one prioritized cut edge quality feature. Alternatively or additionally, the input unit can be designed to input at least one low-priority cut edge quality feature. As an alternative or in addition, the input unit can be designed to input a prioritization sequence of cut edge quality features. By specifying at least one prioritized and/or less prioritized cut edge quality feature, the process parameter algorithm can output particularly targeted process parameter recommendations. The process parameter algorithm is generally designed to determine the best possible cut edge quality, depending on the method, however, the special emphasis of a cut edge quality feature to the disadvantage of other cut edge quality features can lead to advantages in the further processing of a workpiece. The device thus offers the greatest possible flexibility in use. The input unit can also be designed to evaluate the cut workpiece, in particular to evaluate the laser cut edge result achieved according to individual cut edge quality features or to input requests for changes, in particular improvement, of the quality of individual cut edge quality features.

The computing unit can be designed with the process parameter algorithm and/or a database for storing the machine parameters, the material parameters, the cut edge quality features, the process parameters, and/or the desired cut edge quality features to be cloud-based.

The device can have a display for outputting the process parameter recommendation and/or the laser cutting machine can be directly controllable by the computing unit.

Further advantages of the invention result from the description and the drawings. Likewise, according to the invention, the aforementioned features and those which are to be explained below can each be used individually for themselves or for a plurality of combinations of any kind. The embodiments shown and described are not to be understood as an exhaustive enumeration but rather have exemplary character for the description of the invention.

FIG. 1 shows a device 10 for processing a workpiece 12 with a laser cutting machine 14.

At least one material parameter 18, which is particularly indicative of the workpiece material used and/or the thickness thereof, at least one machine parameter 20, which is in particular indicative of the laser cutting machine 14 used and preferably at least one desired cut edge quality feature, is entered via an input unit 16. Furthermore, at least one desired process parameter, in particular laser power, depth of focus, feed rate, and/or gas flow, can be input via the input unit 16.

The device 10 can be designed to independently determine the material parameter 18 used by metrological detection, in particular by weight measurement and comparison with stored material characteristics, as well as the workpiece dimensions of the workpiece 12, in particular by measuring the workpiece 12. Furthermore, the device 10 can be designed to independently determine the laser cutting machine 14 used. Such configurations reduce the input effort in advance of workpiece processing by the laser cutting machine 14.

A computing unit 22 with a process parameter algorithm 24 reads according to a method step A) the entered material parameters 18 and machine parameters 20 as well as in particular the desired cut edge quality feature and/or the desired process parameters and stores the information in a data record 26 in a database 28. On the basis of the information entered, the process parameter algorithm 24 determines the improved, preferably optimal process parameters, and/or the process parameters required to achieve the desired cut edge quality feature in accordance with a method step B).

For this purpose, the process parameter algorithm has a data aggregation routine 27. The process parameter algorithm is preferably designed in the form of the data aggregation routine 27.

The process parameters determined in this way are output via the display 30 and/or forwarded to a controller 32 for controlling the laser cutting machine 14. After the improved, preferably optimal, process parameters have been announced, the user can either share the process parameter recommendation for use or set the process parameters in some other way and start the processing process. Subsequently, the workpiece 12 is processed according to a method step C) by the laser cutting machine 14 and on the basis of the specified process parameters. The process parameters that are decisive for the processing of the workpiece 12 by the laser cutting machine 14 and the process parameters proposed by the process parameter algorithm 24 are added to the data record 26 of this workpiece processing.

In order to allow the workpiece 12 to be clearly assigned to the data record 26, the workpiece 12 can be identified within the process manually or automatically, in particular by laser engraving a QR code during the laser cutting process. Such a marking also has the advantage of an automated assignment of the workpiece by simply scanning the workpiece 12 in the further course of the process. If the workpiece 12 is marked accordingly, corresponding information is added to the data record 26 of this workpiece processing.

Following the processing of the workpiece 12, the quality of the resulting cut edge, in particular the different cut edge quality features, is determined according to a method step D). This can be done by means of a subjective assessment by a person skilled in the art, who carries out a corresponding assessment and adds this workpiece processing to the data record 26. After the processing of the workpiece 12 by the laser cutting machine 14, an objective determination of the cut edge quality features is preferably carried out in a measuring device 34. The measuring device 34 is preferably designed to carry out measurements automatically and to automatically add measurement results to the corresponding data record 26 of the workpiece processing in a method step E).

The database 28 is designed to store all data records 26 of workpiece processing. The database 28 thus forms the basis for the change, in particular improvement, preferably optimization, of the process parameter algorithm 24.

Workpieces 12 that have already been processed are preferably evaluated with regard to their cut edge quality features and used to improve the process with regard to the processing of subsequent workpieces 12.

When laser cutting, for example by sensors, measured transient process parameters 36 can also be stored in the database 28 and can supplement the data record 26 of the current workpiece processing. In particular, this offers the advantage of determining fluctuations in the process parameters during laser cutting and including them in an assessment of the cut edge quality. This allows a particularly high level of predictability to be achieved with regard to the cut edge quality and the machine condition.

On the basis of stored data records 26 in the database 28, a change, in particular an improvement, preferably an optimization, of the at least one, in particular all, data aggregation routine(s) 27 of the process parameter algorithm 24 can take place. In this case, data records 26 from different users of methods and devices 10 can also be used together in order to determine an improved, in particular optimal, relationship between input and output parameters of the at least one data aggregation routine 27.

In other words, the invention relates to a method and a device 10 for processing a workpiece 12 by a laser cutting machine 14. Material parameters 18, machine parameters 20 and, in particular, process parameters and/or a desired cut edge quality are specified for the controller 32 via an input unit 16. A computing unit 22 uses a process parameter algorithm 24 to determine, on the basis of the information specified, improved, preferably optimal process parameters for processing the workpiece 12 using at least one data aggregation routine 27. The process parameter algorithm 24 outputs the improved, preferably optimal process parameters as a recommendation via a display 30 and/or for direct control of the laser cutting machine 14 to the controller 32. The at least one data aggregation routine 27 is preferably checked and/or improved, in particular continuously further improved, by the feedback of a plurality of different types of cut edge quality features, these cut edge quality features being subjectively and/or objectively determined from cut edges produced with the method or the device.

The method and device aspects described can be used in particular for cutting hard workpieces 12, such as glass or metal, in particular sheet metal. When cutting such workpieces, the output of a process parameter recommendation is a particular challenge, because the many process parameters influence each other and the causal relationships for achieving the desired cut edge quality are not known and can only be determined with great effort. The sheet metal can be designed flat or shaped and the laser cutting machine 14 can accordingly be a flatbed machine or a 3D laser cutting machine.

The described methods and device aspects can in particular be used to generate a virtual model for the laser cutting processing. With such a model, process parameter recommendations can be output even faster and better.

The described method and device aspects can be integrated in a particularly advantageous manner in a manufacturing execution system (MES) for the industrial manufacture of workpieces. A plurality of processing plans can be stored in a manufacturing execution system. Order information for the industrial processing of workpieces and/or workpiece assemblies can be stored in the processing plans. In addition to laser cutting, the processing plans can contain further processing steps or processes such as shaping, bending, punching, heating, welding, joining, surface processing, etc., which the workpiece can run through in parallel or sequentially. In this way, the workpieces can run through a plurality of processing steps in a coordinated manner and the cut edge quality can be set and improved in the entire manufacturing execution. The IVIES can be designed so that processing plans for the workpieces to be produced can be created in it and processed with it. The MES can also be designed to display the status of the workpieces. This means that the MES can be designed to output both the sequence of the processing steps and the processing steps that have already been carried out. The MES can advantageously also be designed to assign individual processing plans to the machine tools. Advantageously, the IVIES can also be designed so that it is possible to manually or automatically intervene at any time in the processing steps of a processing plan. This has the advantage that, during the manufacturing process, a plurality of different processing plans can react very flexibly to different, in particular unexpected, events. These events can be, for example: change in the priority of processing plans or production orders, a new high-priority production order, cancellation of a production order, missing material, e.g. in the event of wrong delivery, failure of a machine, lack of specialist staff, accidents, detection of defective quality of a manufacturing step, etc. The MES can be installed locally in the manufacturing facility and/or remotely at least partially cloud-based.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Device
12 Workpiece
14 Laser cutting machine
16 Input unit
18 Material parameters
20 Machine parameters
22 Computing unit
24 Process parameter algorithm
26 Data record
27 Data aggregation routine
28 Database
30 Display
32 Controller
34 Measuring device
36 Transient process parameters

What is claimed is:

1. A method for processing a workpiece with a laser cutting machine, the method comprising:
A) reading out at least one machine parameter, at least one material parameter, and at least one prioritized cut edge quality feature;
B) executing a process parameter algorithm which outputs a process parameter recommendation, the process parameter algorithm having at least one data aggregation routine, and the process parameter algorithm being configured to determine the process parameter recommendation based on a plurality of cut edge quality features and the at least one prioritized cut edge quality feature using the at least one data aggregation routine so that one edge quality feature is emphasized to a disadvantage of other cut edge quality features of the plurality of cut edge quality features; and
C) operating a laser cutting machine to perform laser processing of the workpiece based on the process parameter recommendation.

2. The method according to claim 1, wherein the cut edge quality features include roughness thickness, roughness shape, burr height, burr shape, cut edge bevel, and/or discoloration.

3. The method according to claim 1, further comprising:
   D) determining a plurality of cut edge quality features of the machined workpiece;
   E) reading out these cut edge quality features in order to change the process parameter algorithm.

4. The method according to claim 3, wherein at least one cut edge quality feature is objectively determined by a measuring device.

5. The method according to claim 4, wherein the at least one cut edge quality feature is determined by an image recording device.

6. The method according to claim 1, wherein the process parameter algorithm and/or a database are stored in cloud-based storage, wherein the machine parameters, the material parameters, the cut edge quality features and/or the desired cut edge quality features are stored in the database.

7. The method according to claim 1, wherein the output of the process parameter recommendation in B) takes place on a display and/or the output of the process parameter recommendation in B) is used directly for laser processing of the workpiece in C).

8. A device for processing a workpiece, the device comprising:
   a) an input unit configured to input at least one machine parameter, at least one material parameter, and at least one prioritized cut edge quality feature;
   b) a computing unit configured to execute a process parameter algorithm configured to output a process parameter recommendation, the process parameter algorithm having at least one data aggregation routine, and the process parameter algorithm being configured to determine the process parameter recommendation based on a plurality of cut edge quality features and the at least one prioritized cut edge quality feature using the at least one data aggregation routine so that one edge quality feature is emphasized to a disadvantage of other cut edge quality features of the plurality of cut edge quality features; and
   c) a laser cutting machine configured to perform laser processing of the workpiece based on the process parameter recommendation.

9. The device according to claim 8, wherein the device comprises:
   d) a measuring device configured to objectively determine at least one cut edge quality feature.

10. The device according to claim 9, wherein the measuring device is an image recording device.

11. The device according to claim 8, wherein the at least one prioritized cut edge quality feature comprises a low-priority cut edge quality feature.

12. The device according to claim 8, wherein the computing unit further includes a database for storing the machine parameters, the material parameters, the cut edge quality features, the process parameters, and/or the at least one prioritized cut edge quality feature, wherein the database is cloud-based.

13. The device according to claim 8, the device further comprising a display configured to output the process parameter recommendation, and/or
   wherein the laser cutting machine is configured to be controlled directly by the computing unit.

14. The device according to claim 8, wherein the at least one prioritized cut edge quality feature comprises a prioritization sequence of cut edge quality features.

15. The device according to claim 8, wherein the at least one prioritized cut edge quality feature is associated with a superordinate value or a subordinate value.

* * * * *